Jan. 4, 1966   G. ALFIERI   3,227,494
COMPRESSED AIR DISTRIBUTORS WITH ONE OR MORE SECTIONS
Filed June 12, 1961   3 Sheets-Sheet 1
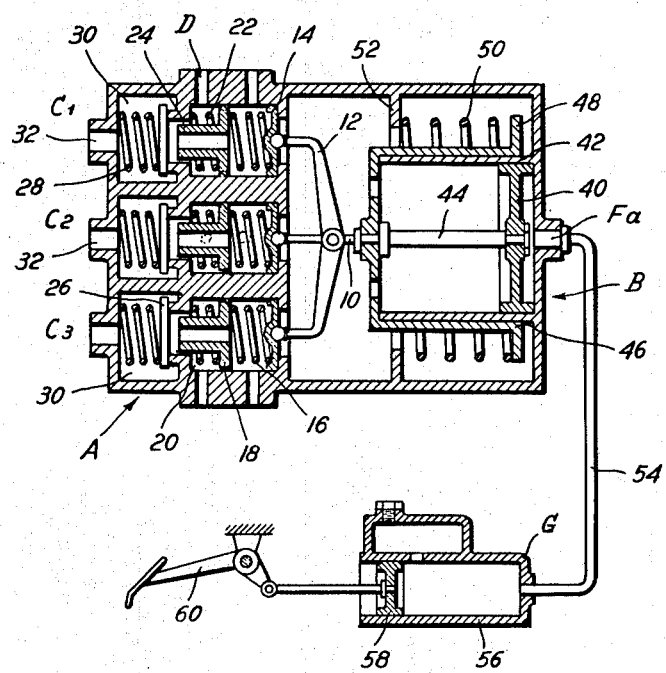
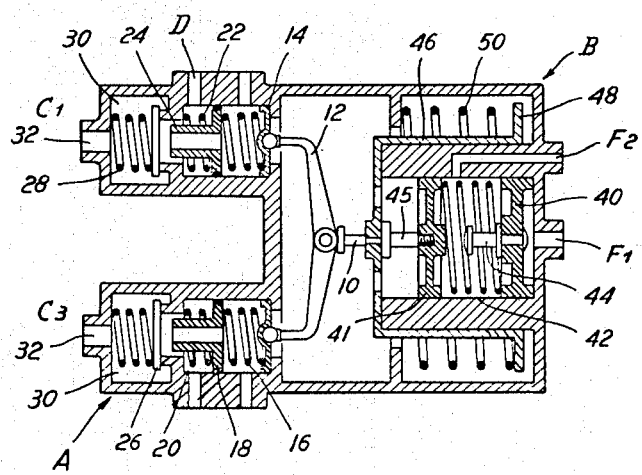

United States Patent Office 3,227,494
Patented Jan. 4, 1966

3,227,494
COMPRESSED AIR DISTRIBUTORS WITH ONE OR MORE SECTIONS
Giuseppe Alfieri, Milan, Italy, assignor to Fabbrica Italiana Magneti Marelli S.p.A., Milan, Italy, a corporation of Italy
Filed June 12, 1961, Ser. No. 116,361
Claims priority, application Italy, June 24, 1960, 11,269/60
4 Claims. (Cl. 303—40)

It is known that mechanically operated distributors are arranged on account of reasons of a practical character, close to the operating pedal, to be actuated directly by the pedal or through transmission levers or links.

In some cases such arrangements do not cause constructional complications nor operational irregularities; but, on the contrary in many cases the mechanical control and the consequent arrangement in the proximity of the pedals cause constructional and functional inconveniences.

A serious constructional inconveniency is constituted by the length of the pipelines connecting the distributor to the tanks, which are, generally, placed in the center and rear zones of the autocar. Especially in the case of distributors having several sections, the piping assumes a considerable extension, requiring numerous bends in the piping and the necessity for many fixing devices for attaching the tubes to the frame.

The great length of the piping is a cause of working difficulties; inasmuch as it reduces the rapidity of braking the vehicle. Further, the piping connecting the distributor to the braking elements, when the distributor is arranged close to the pedal and, hence, to the fore end of the vehicle, have different lengths for each axle, causing a noticeable time difference in the braking of each axle, which difference may become large in very long vehicles. This fault might be eliminated by converging the pipings toward a baricentric branching point such as to require about equal lengths for each axle; but this would cause a further increase of the piping length and a consequent reduction of the resultant braking rapidity.

It is also known that the vehicles being provided in part with right hand, and in part with left hand drive, they have necessarily to be equipped with right and left hand distributors and mechanical transmissions, which is a cause of high cost and complication for the procurement, the construction, the assembling, the storing, etc., of the vehicles. Further, the ever increasing use of overturnable or spring-mounted driving cabins in respect to the frames renders the efficiency of remote control mechanical transmissions, and in the case of distributors controlled directly by the pedal requires that the connections between the distributors and the rigid connections to the compressor, to the tanks and the braking elements be made with flexible connections which are very costly, easily deteriorated and necessitate double the number of connection fittings.

The object of the present invention is a compressed air distributor that integrally eliminates all the above mentioned inconveniences.

The said distributor is characterized by the fact that receiving organs operating directly on the distributor itself and forming a single unit therewith, are connected with organs for the transmission of the remote controls through a fluid under pressure.

Another characteristic of the invention is the interchangeability of the organs operating upon the compressed air distributor, incorporated within an integrating part thereof.

Lastly, the invention relates to a compressed air distributor comprising double controls by means of fluids and elastic fluids in particular; such controls being to be used the one in case of failure of the other.

The features of the invention will be illustrated and described by reference to the schematic drawings given only as non-limitative examples.

FIGURE 1 is a diagrammatic section view of a hydraulic device as applied to a compressed air distributor.

FIGURES 2 and 3 are diagrammatic sections of two other embodiments of the hydraulic device for compressed air distributors with two and three braking sections, respectively.

Figure 3:
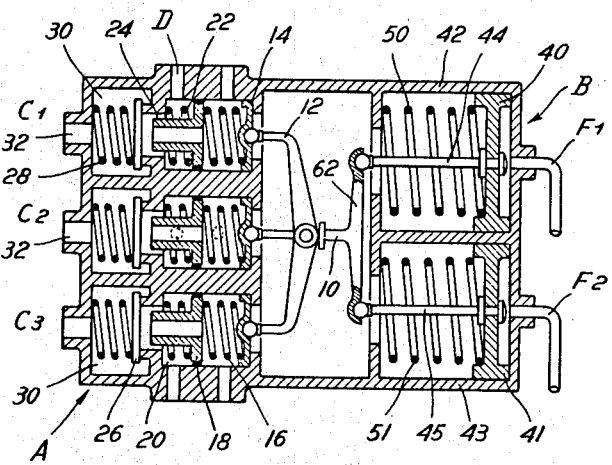

Referring to the figures, reference numerals correspond to like parts thereof. A indicates the compressed air distributors with one or more braking sections $C_1$ and $C_2$; $C_1$, $C_2$ and $C_3$, and so on. B indicates the devices according to the invention, which are embodied in such a way that their movable member or members act directly upon a push rod 10 associated with the compressed air distributor under consideration to drive directly or by a rocking lever the group (or groups) of valves associated with the different braking sections of these compressed air distributors.

Each group of valves $C_1$, $C_2$ and so on is constituted in a known way by a movable cup 14 under the load of a spring 16 acting upon a piston 18, which sealingly slides in a chamber 20 connected through a pipe fitting D to the braking members of the vehicle (not shown in the drawing).

The piston 18 is under the control of a regulation spring 22 and is secured to a bored push rod 24, whose free end is sealingly engaged with an associated inlet valve 26 pushed against its seat by a spring 28 and arranged in a chamber 30 connected through a pipe fitting 32 to the compressed air reservoir of the braking installation (not shown in the drawing).

The device B (FIGURE 1) is constituted by a piston 40, which slides in a cylinder or fixed guide sleeve 42 and whose rod 44 is secured with push rod 10 of the compressed air distributor under consideration.

A sleeve type cylinder 46 is secured to said push rod 10, and is provided with a border 48 holding the extremity of a return spring 50, the other extremity of which is retained by a rim 52 integrally formed on the device casing B which is integral with the casing of compressed air distributor A.

For the remote control of compressed air distributor A, the piston and cylinder unit 40–46 is connected to a pipe fitting $F_a$ and through a pipe 54 to cylinder 56 of a pump G, whose piston 58 is secured to a foot lever 60 or other suitable driving member.

The operation of foot lever 60 moves piston 58 of pump G, which displaces liquid under pressure into the sleeve 42 causing in such a way the motion of piston 40 against the action of spring 50, whereby the compressed air distributor is actuated in a known way. When operation of foot lever 60 is discontinued, piston 58 retracts and the action of return spring 50 recalls piston 40 and compressed air distributor A in the rest position. The device as now described enables arrangement of compressed air distributor A in the best position so that the number and length of pipes connecting the compressed air distributor to the brakes are reduced in such a way as to achieve a quick and balanced braking of the vehicle.

The hydraulic transmission device as above referred to and embodied in the compressed air distributor can be provided with two braking sections in a tandem arrangement of the cylinder-piston units as shown in FIGURE 2 or in a parallel arrangement of the cylinder-piston units as shown in FIGURE 3, to the end of increasing the safety margin of operation for the compressed air distributor A with a hydraulic transmission.

Referring to FIGURE 2, the device includes a cylinder type fixed sleeve 42, wherein two closely following pistons are arranged, that co-operate with one another. Specifically, the end of piston rod 44 of piston 40 can engage with the end of piston 41, whose rod 45 is fixed to the push rod 10 of compressed air distributor A and is also fixed to the cylinder 46, which is under the control of a coil spring 50.

The chambers as confined in the sleeve 42 by the pistons 40, 41 are connected through pipe fittings $F_1$, $F_2$ to pipes ending into the cylinders of two hydraulic pumps (not shown) and which can be driven by the same control member as the foot lever 60 of device shown in FIGURE 1.

If one of the two braking sections of the device above referred to fails, the other braking section ensures the whole efficiency of the braking installation inasmuch as the compressed air distributor A is under the control of any one of the braking sections of the device under consideration. It is to be understood, that also in this case the illustrated compressed air distributor A is of the kind with two braking sections or duplex distributor; it might have, however, one or more braking sections.

When acting upon the control member of the double pump as above mentioned liquid under pressure is sent to the pipe fittings $F_1$ and $F_2$ or also to one only thereof, said pressure liquid acting upon one or both pistons 40 and 41 to displace them in order to control the compressed air distributor A as above referred to. If the liquid under pressure is sent to one of pipe fittings $F_1$, $F_2$, then one of the pistons 40, 41 actuates the compressed air distributor as already stated and the return spring 50, through cylinder 46, carries the piston 40 or 41 back to the reset position again.

The embodiment shown in FIGURE 3 is similar to that of FIGURE 2, except for the two cylinder-piston units 42–40 and 43–41 being arranged in parallel in this case. Specifically, the device casing has two cylinders 42–43 arranged side by side and wherein slide the pistons 40 and 41, respectively, under the control of associated springs 50 and 51. The rods 44 and 45 of these pistons are connected by hinges to a cross member 62 secured to push rod 10 of compressed air distributor A.

The operation of the device illustrated in FIGURE 3 of the drawings is similar to that of FIGURE 2 and the pipe fittings $F_1$, $F_2$ are connected to the two associated pumps in the same way as referred to above.

The cylinders 42 and 43 in the embodiment according to FIGURE 2 as well as in the embodiment according to FIGURE 3 can be separately connected to the cylinders of tandem or parallel arranged hydraulic pumps and also to the cylinders of two hydraulic pumps which are actuated one independently of the other.

Figure 4:
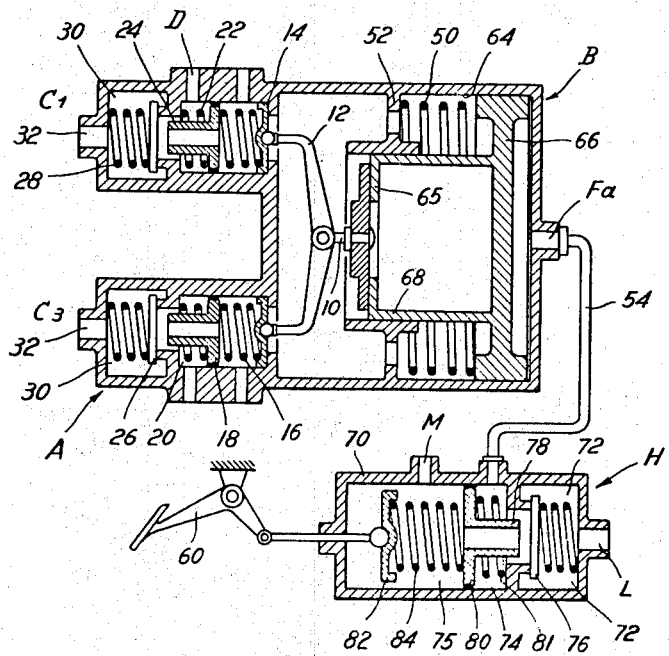
FIGURE 4 is a diagrammatic section of another embodiment of a pneumatic device as applied to a compressed air distributor with two braking sections.

Referring to FIGURE 4 of the drawings, this figure illustrates a further embodiment of a pneumatic device B. This device includes a casing cylinder 64 wherein a piston 66 slides against a spring 50 to actuate through push rod 10 the compressed air distributor A with one or more sections C.

In this embodiment the compressed air distributor is under the control of the same compressed air feeding the distributor. The piston 66 is integrally connected to a sliding cylinder 68, which is guided by a guide sleeve 52 integrally formed on the casing of the device and which is connected to the push rod 10 to actuate the compressed air distributor A.

Cylinder 64 is connected through a pipe fitting $F_a$ to a control member H constituted by an auxiliary compressed air distributor under the control of a foot lever 60 or other manually controlled lever and which might be of the same kind as that of distributor braking sections C. The distributor H has a casing 70 divided in three chambers, i.e., 72 (connected through a pipe fitting L to a pressure fluid source), 74 (connected through a pipe 54 to the pipe fitting $F_a$ of the device B) and 75 (connected through a pipe fitting M to the blow off). The communication between chambers 72 and 74 is under the control of a spring-loaded valve 76, which is actuated by a bored push rod 78, fixed on the end of a piston 80 under the control of a spring and which sealingly slides in the casing 70. The piston 80 separates the two chambers 74, 75 from one another. The foot lever 60 actuates piston 80 through a cup 82 and a spring 84. Operation of foot lever 60 displaces cup 82 and through the spring 84 displaces also the bored push rod 78, whose end sealingly abuts against the inlet valve 76 to cause a compressed air inflow into cylinder 43 by actuating in such a way piston 66 and thereby the compressed air distributor A.

When the operating of foot lever 60 is discontinued, then the return springs 84 and 81 remove push rod 78 from the inlet valve 76 to cut off the communication between chambers 72 and 74 and to establish a communication of chamber 74 with outlet M. In such a way the compressed air contained in cylinder 64 is discharged and consequently the spring 50 carries piston 66 back to the starting position again. Also the compressed air distributor A is carried back to said position again.

The application of more operating members for the remote control of the compressed air distributors A, carried out in such a way that they use two different energy sources to control the associated distributor, ensures always the efficiency of the vehicle braking installation.

Figure 5:
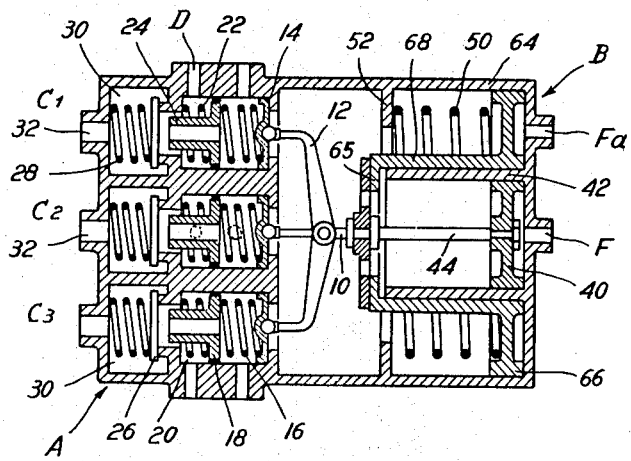
FIGURE 5 is a diagrammatic section of a further embodiment of the device as a hydraulic-pneumatic device.

FIGURE 5 is a diagrammatic view of a further embodiment of device B to achieve these purposes with a distributor A having three braking sections $C_1$, $C_2$, $C_3$ all linked to the same push rod 10 under the control of device B.

Figure 6:
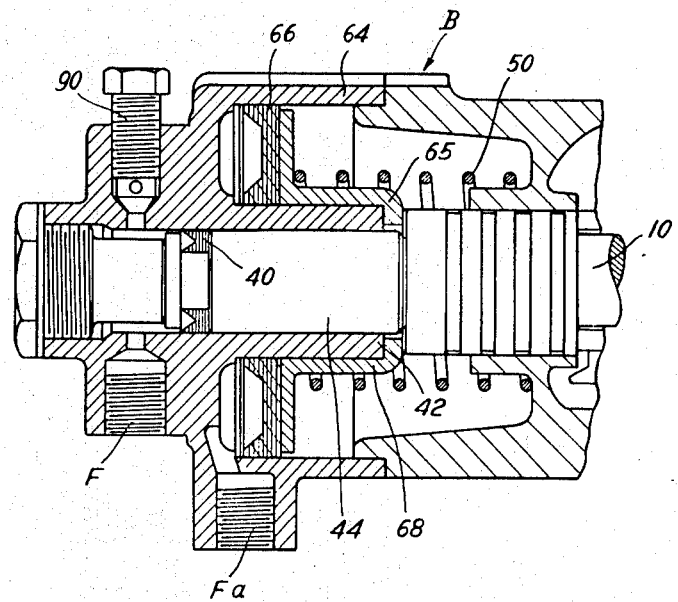
FIGURE 6 is a partial axial section of the device as embodied according to FIGURE 5.

FIGURE 6 is an axial section of the device illustrated in FIGURE 5. This device is constituted by a pneumatic piston 66 sliding in a casing cylinder 64 against a spring 50. Said piston 66 has a sleeve type cylinder 68, which slides on the outside of a fixed guide sleeve 42 that is coaxial to and inside of cylinder 64. A piston 40 slides in the sleeve 42 and the rod 44 thereof co-operates with a push rod 10 of compressed air distributor A. Also a rim 65 co-operates with this push rod, said rim being provided at the extremity of the slidable cylinder 68 and co-operating on one side with a flanged end of sleeve 42 to form an abutment and on the other side with push rod 10 for actuation thereof.

Sleeve 42 and cylinder 64 are connected through pipe fittings F and $F_a$ to associated hydraulic and pneumatic operating members, for instance, of the kind G, as shown in FIGURE 1 or H as shown in FIGURE 4.

Referring to FIGURE 6, sleeve 42 is completed by a valve 90 to blow-off the air contained in the pipes and in the sleeve 42. In this embodiment, the pistons 40 and 66 act one independently of the other upon the push rod 10 controlling the compressed air distributor A. As said pistons are coaxial and independent from one another, they act singularly and in the same direction upon push rod 10 against the distributor return springs as well as the device spring 50. As in general the pressures created by the actuation members G and H and established in sleeve 42 and cylinder 64 differ from one another (specifically, the pressure in cylinder 64 is lesser than the pressure in sleeve 42), the cross-sections of these cylinders are suitably dimensioned so that the associated pistons 40 and 66 apply substantially the same force to push rod 10.

In the embodiment shown in FIGURE 6 the sleeve 42 and cylinder 64 are coaxial to one another and form a single body, which can be associated with the distributor body or made integral therewith; this enables an easy connection between push rod 10 and both pistons 40 and 66. Besides the advantages achieved by means of the device according to the present invention as above referred to, it should be noted that said device enables any displacement whatsoever between the compressed air distributor A and one or more of the operating members G and/or H to take place, in relation to installation requirements a.s.o.

A further advantage of the device consists in the possibility of incorporating or associating the device with the compressed air distributor in such a way as to be made integral therewith. This device might be secured or linked, for instance, to the cover of the compressed air distributor whatever kind this latter may be, that is, simplex, duplex, triplex distributor or any other known kind thereof.

The present invention enables an easy solution of the problems met by the manufacturers of pneumatic braking apparatus as well as by the manufacturers of motor vehicles especially as regards the installation and positioning of the braking plant in the motor vehicle.

Inasmuch as many changes could be made in the above construction and many more widely different embodiments of the present invention could be made without departing from the scope thereof, it is intended that all matter contained in the above description or shown in the accompanying drawings shall be interpreted as illustrative and not in a limiting sense.

What is claimed is:

1. In a vehicle braking system having a plurality of braking sections, the combination comprising compressed air distributor means having a plurality of sections corresponding to a similar plurality of braking sections, distributor operating members for said plurality of sections including a rocking lever, a movable piston and cylinder unit connected to said rocking lever for operating said distributor operating members, spring means biasing said piston and cylinder unit for forcing said rocking lever in one direction, pressure chamber means operatively associated with said piston and cylinder unit, means communicating with said chamber means to establish an operating pressure therein whereby said piston and cylinder unit forces said rocking lever to be moved in another direction against the biasing of said spring means, said chamber means being defined by a fixed sleeve, and said piston and cylinder unit comprising a piston slidably disposed inside said sleeve and a cylinder fixed to said piston and being slidably disposed outside said sleeve.

2. In a vehicle braking system having a plurality of braking sections, the combination comprising compressed air distributor means having a plurality of sections corresponding to a similar plurality of braking sections, distributor operating members for said plurality of sections including a rocking lever, a movable piston and cylinder unit connected to said rocking lever for operating said distributor operating members, spring means biasing said piston and cylinder unit for forcing said rocking lever in one direction, pressure chamber means operatively associated with said piston and cylinder unit, means communicating with said chamber means to establish an operating pressure therein whereby said piston and cylinder unit forces said rocking lever to be moved in another direction against the biasing of said spring means, said chamber means including a pair of coaxial chambers defined by the opposite sides of a first piston slidable in a fixed sleeve, and said piston and cylinder unit comprising a cylinder slidably disposed on the exterior of said sleeve and a second piston fixed to said cylinder and being slidably disposed in said sleeve in coaxial relation to said first piston.

3. In a vehicle braking system having a plurality of braking sections, the combination comprising compressed air distributor means having a plurality of sections corresponding to a similar plurality of braking sections, distributor operating members for said plurality of sections including a rocking lever, a movable piston and cylinder unit connected to said rocking lever for operating said distributor operating members, spring means biasing said piston and cylinder unit for forcing said rocking lever in one direction, pressure chamber means operatively associated with said piston and cylinder unit, means communicating with said chamber means to establish an operating pressure therein whereby said piston and cylinder unit forces said rocking lever to be moved in another direction against the biasing of said spring means, said chamber means including a pair of concentric chambers defined by the interior and exterior of a fixed sleeve, and said piston and cylinder unit comprising a piston slidably disposed against the interior of said sleeve and a cylinder fixed to said piston and being slidably disposed against the exterior of said sleeve.

4. The combination as recited in claim 1 wherein said cylinder includes a rim portion defining a second piston slidably disposed on the outside of said sleeve.

References Cited by the Examiner

UNITED STATES PATENTS

| 2,456,320 | 12/1948 | Repke | 60—97 X |
| 2,484,888 | 10/1949 | Hollerith | 303—54 X |
| 2,664,708 | 1/1954 | Norelius et al. | 60—97 |

FOREIGN PATENTS 813,001   5/1959   Great Britain.

MILTON BUCHLER, *Primary Examiner.*

K. J. ALBRECHT, FERGUS S. MIDDLETON,
*Examiners.*